No. 860,663. PATENTED JULY 23, 1907.
J. W. HIGGINBOTHAM.
NUT LOCK.
APPLICATION FILED APR. 13, 1907.
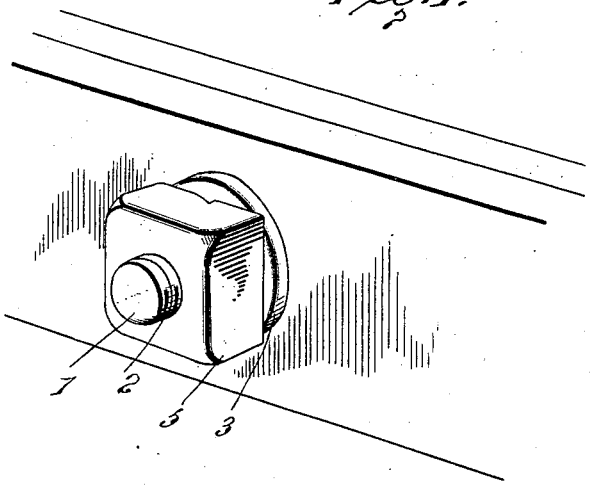
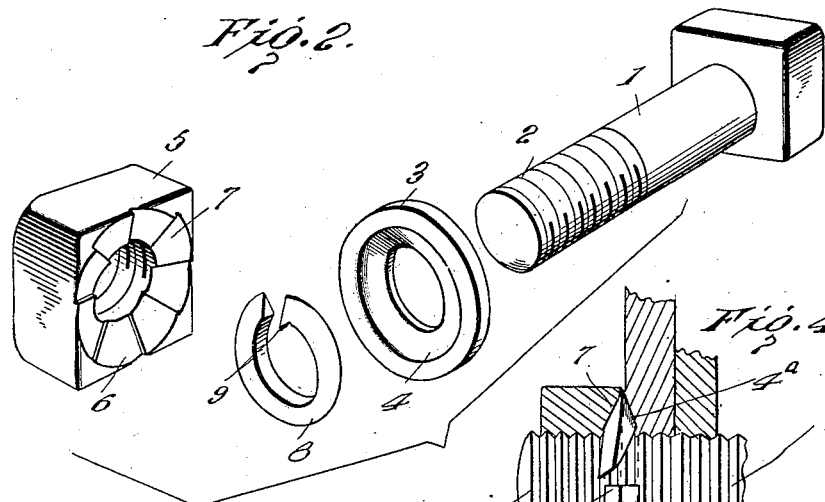
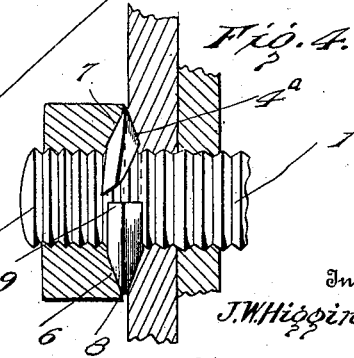
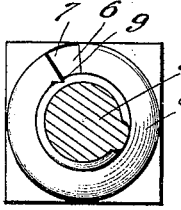
Inventor
J. W. Higginbotham
Witnesses
By
Attorneys
THE NORRIS PETERS CO., WASHINGTON, D. C.

UNITED STATES PATENT OFFICE.

JOHN W. HIGGINBOTHAM, OF HEIZER, WEST VIRGINIA.

NUT-LOCK.

No. 860,663.        Specification of Letters Patent.        Patented July 23, 1907.

Application filed April 13, 1907. Serial No. 368,030.

*To all whom it may concern:*

Be it known that I, JOHN W. HIGGINBOTHAM, a citizen of the United States, residing at Heizer, in the county of Putnam and State of West Virginia, have invented certain new and useful Improvements in Nut-Locks, of which the following is a specification.

The present invention pertains to improvements in nut locks and has for its object to provide a novel and efficient means whereby the nuts may be positively prevented from working loose.

The invention also aims to accomplish this result by means of a simple and comparatively inexpensive construction which can be readily applied to any of the conventional forms of bolts in common use.

For a full description of the invention and the merits thereof and also to acquire a knowledge of the details of construction of the means for effecting the result, reference is to be had to the following description and accompanying drawings, in which:

Figure 1 is a perspective view of a nut lock embodying the present invention. Fig. 2 is a perspective view of the nut lock, the various members being detached. Fig. 3 is a transverse sectional view through the nut lock. Fig. 4 is a longitudinal sectional view, showing a modification.

Corresponding and like parts are referred to in the following description and indicated in all the views of the drawings by the same reference characters.

Specifically describing the invention the numeral 1 designates a bolt of the usual type provided with the threaded end 2. Fitted upon the bolt 1 is a washer member 3, the outer face of which has the inner edge thereof beveled to form the depression 4 surrounding the bolt receiving opening extending through the said washer member. A nut 5 having any approved configuration is screwed upon the threaded portion 2 of the bolt 1 and coöperates therewith in the usual manner. The inner face of the nut 5 is formed with a depression 6 surrounding the bolt receiving opening, the walls of the said depression being inclined and formed with the radial notches or teeth 7 constituting a ratchet surface. The depression 6 in the nut and the depression 4 in the washer member face each other and form a chamber which receives a split ring 8. One end of the split ring 8 carries an inwardly extending tooth 9 designed to bite into the threaded portion of the bolt and prevent the rotation of the ring thereon, while the opposite end of the split ring is reduced in cross section and bent outwardly so as to have a spring engagement with the notches 7. The ring 8 normally fits loosely upon the bolt 1 so as to rotate freely thereon and slide longitudinally and has an approximately triangular cross section, the inclined sides being designed to engage the beveled walls of the depressions 6 and 4 in the nut and washer members respectively. Owing to this construction the said beveled walls of the depressions have a wedge-like action upon the split ring and operate when screwed tightly against each other to compress the split ring and clamp the same around the bolt, thereby forcing the tooth 9 to bite into the threads 2 and effectively locking the ring against rotary movement. The outwardly bent extension of the split ring then has a ratchet like engagement with the notches 7 which permits the nut to be screwed into position, but prevents any backward movement thereof.

When employed in conjunction with machines or the like as shown in Fig. 4, one of the members being bolted together may constitute the washer member and have the depression 4ª formed directly therein. The operation of the locking device, however, is identical with that previously described.

Having thus described the invention, what is claimed as new is:

1. In a nut lock, the combination of a bolt, a washer member received by the bolt, a nut coöperating with the bolt, said washer member and nut being provided with coöperating inclined walls, and a split ring interposed between the washer member and the nut and engaging the before mentioned inclined walls whereby it is wedged into engagement with the bolt when the nut is tightened.

2. In a nut lock, the combination of a bolt, a washer member received by the bolt, a nut coöperating with the bolt, the said washer member and nut being provided with coöperating inclined walls, and a split ring interposed between the washer member and the nut and designed to be compressed by engagement with the before mentioned inclined walls when the nut is tightened, one end of the split ring engaging the nut to prevent the same from working loose.

3. In a nut lock, the combination of a bolt, a washer member received by the bolt, a nut coöperating with the bolt, the said washer member and nut being provided upon their adjacent faces with coöperating inclined walls, and a split ring interposed between the washer member and nut and having an approximately triangular cross section whereby it is compressed into engagement with the bolt when the nut is tightened, one end of the split ring having a positive engagement with the bolt while the opposite end engages the nut to lock the same against working loose.

4. In a nut lock, the combination of a bolt, a washer member received by the bolt and provided on its outer face with a depression surrounding the bolt receiving opening and formed with inclined sides, a nut coöperating with the bolt and provided upon its inner face with a depression formed with inclined walls having radial notches formed therein, and a split ring having an approximately triangular cross section and fitting within the chamber formed by the corresponding depressions in the washer member and nut, one end of the split ring carrying a tooth designed to bite into the bolt while the opposite end is extended outwardly and is adapted to have a spring engagement with the above mentioned notches in the nut, the inclined walls of the said depressions coöperating with each other to wedge the split ring against the bolt.

In testimony whereof I affix my signature in presence of two witnesses.

JOHN W. HIGGINBOTHAM. [L. S.]

Witnesses:
  LETHA C. MCKEE,
  ROENA MCKEE.